Patented Feb. 22, 1927.

1,618,834

UNITED STATES PATENT OFFICE.

WALTER A. KUHNERT, OF LOS ANGELES, CALIFORNIA.

PROCESS FOR RECOVERY OF SODIUM SESQUICARBONATE FROM BRINES.

No Drawing.  Application filed July 27, 1925. Serial No. 46,488.

This invention relates to a process for treatment of salt brines containing sodium carbonate for the purpose of recovering soda principally in the form of sesquicarbonate. My invention has been applied particularly to the brines existing in Owens Lake, California, but is applicable generally to other brines of the same type containing or consisting of a complex solution of various salts.

In the treatment of such brines it has been proposed to separate the soda therefrom by treatment with carbon dioxide or carbonating agents so as to produce sodium bicarbonate which separates from the solution on account of its relatively low solubility. This method is however open to serious objections in practical use for the following reasons: The precipitated sodium bicarbonate which is formed in such operation is generally of an extremely finely divided nature rendering it difficult to separate from the solution by filtration, centrifuging, or otherwise. The difficulty of filtration is further increased by the fact that colloidal materials, including colloidal silicates and aluminates as well as organic matter are generally present in the brine and products thereof are precipitated along with the sodium bicarbonate and remain with the same on filtration. Moreover these impurities are extremely difficult to remove from the precipitate on account of the difficulty in washing the sodium bicarbonate owing to its finely divided condition.

The main object of the present invention is to separate the soda from such brines in the form of sesquicarbonate and in coarse crystalline form rendering it readily amenable to centrifuging or filtering, and washing. A further advantage of the separation of the soda in the form of comparatively coarse crystals of sesquicarbonate is that the mother liquor can be more thoroughly washed from the crystals, thereby minimizing the contamination of the recovered sodium sesquicarbonate with other salts such as borax, potassium chloride, etc., generally contained in the mother liquor.

Another object of the invention is to reduce as far as possible the expense of precipitation of the soda by carbon dioxide by reducing the amount of such carbon dioxide required for such precipitation, it being an additional advantage of the process that a smaller total quantity of carbon dioxide is required for precipitation in the form of sesquicarbonate than in the form of bicarbonate.

I will describe my invention as applied to the precipitation of soda in the form of sesquicarbonate from a brine such as is found in Owens Lake, California, said brine after solar concentration being of approximately the following composition:

| | Per cent. |
|---|---|
| $Na_2CO_3$ | 14.60 |
| $Na_2B_4O_7.10H_2O$ | 8.25 |
| $NaCl$ | 8.27 |
| $KCl$ | 5.66 |
| $Na_2SO_4$ | 3.19 |
| Other salts and water | 60.03 |
| Total | 100.00 | it being understood that the composition of this brine will change considerably from time to time owing to variations in temperature and evaporation.

The brine is brought by solar evaporation or otherwise to a condition of saturation or substantially so as regards its sodium carbonate constituent at ordinary lake temperature, which in the summer may be in the neighborhood of 100° F. The saturated brine is then pumped into any suitable receptacle or tank, and is subjected to the action of carbon dioxide obtained in any suitable manner, for example from a lime kiln or from a receptacle containing liquid carbon dioxide under pressure. The gases from the lime kiln containing more or less carbon dioxide are pumped by means of any suitable blower, fan, or compressor into contact with the brine. In order to provide effective contact, the gas containing carbon dioxide may be forced into the body of brine under pressure so as to cause the gas to bubble up through the brine and thereby bring the carbon dioxide into intimate contact with the brine. The carbon dioxide is absorbed or reacts with the soda in its passage through the brine while the remaining inert gas serves to very thoroughly agitate the brine thus facilitating the reaction. This operation may be conducted in carbonating towers of the type ordinarily used for carbonation of such brines, said towers being provided for example with perforated diaphragms or other baffle means at intervals throughout the height thereof so as to assist in the distribution of the gas and provide the highest degree of agitation of the brine and the most intimate contact between carbon dioxide and brine. In some cases however I may cause the brine to percolate downwardly through suitable towers over coke or other distributing means, and cause the gases to pass upwardly through the towers so as to provide countercurrent flow of the brine and carbon dioxide bearing gas. When using towers of this latter type the brine is rapidly circulated through the towers by pumping back the solution from the bottom of the towers to the top in a well-known manner. The towers used in the carbonation may be provided with suitable means for controlling the temperature of the brine; for example they may be provided with means for admitting steam thereto to heat the brine.

Heretofore in the separation of soda as sodium bicarbonate from brine of this character it has been usual to supply the carbon dioxide bearing gas at a concentration of about 33% or more of carbon dioxide by volume and to supply the gas at such rate, that for a single batch of liquor containing say 18,000 gallons of brine about 5,000 pounds of carbon dioxide will be used, the carbonating operation lasting about nine hours. This represents an absorption of approximately 30 pounds of carbon dioxide per hour per 1000 gallons of brine. In the operation as carried out in this manner, using carbon dioxide bearing gas with the carbon dioxide concentration and the rate of supply as above stated, the precipitation of soda is substantially all in the form of sodium bicarbonate and the precipitate is extremely fine and therefore difficult to separate from the solution by centrifuging or filtering and difficult to wash. I have found however that by maintaining a materially lower rate of absorption of carbon dioxide in the brine than that heretofore employed which may be accomplished by either suitably reducing the concentration of carbon dioxide in the carbonating gas or by reducing the rate of supply of the carbon dioxide bearing gas to the brine or by reducing both the carbon dioxide content and the rate of supply of the gas, and by properly controlling the temperature, a certain percentage of the soda can be precipitated largely or wholly in the form of sesquicarbonate and in a comparatively coarse crystalline condition, which is well adapted for separation by centrifuging or filtering and washing, so as to remove mother liquor and other impurities from the precipitate.

I have obtained good results by carrying out the precipitation operation in the following manner: The carbon dioxide bearing gas coming from the lime kiln or other supply means is if necessary diluted with air or otherwise so as to present a concentration of about 23 to 28% of carbon dioxide and this gas is brought into contact with the solution in the manner above described at a temperature of about 37° C. (or say from 30° C. to 45° C.), the carbonation of the brine in this manner being conducted for about 12 hours, with the result that a portion of the soda is precipitated largely or wholly in the form of sesquicarbonate and the sodium carbonate in solution is reduced from say about 14% to about 8% or less. The reduction of the sodium carbonate content of 18000 gallons of brine from 14% to 8% requires, by my process, about 1700 pounds of carbon dioxide, as against 5000 pounds required by the ordinary method above referred to. The concentration of carbon dioxide in the gas and the rate of supplying such gas to the brine may therefore be such as to provide about 1700 pounds of carbon dioxide in 12 hours for each 18000 gallons of brine. This represents an absorption of only about 8 pounds of carbon dioxide per hour per 1000 gallons of brine which is materially less than in the usual practice as above outlined. The liquor is then passed through suitable separating means as centrifuging or filtering apparatus, or both, for separation of the precipitated sodium sesquicarbonate along with any sodium bicarbonate which may be precipitated at the same time. It is desirable however to regulate the concentration and rate of flow of carbon dioxide bearing gas in such manner that the amount of sesquicarbonate precipitated will be at a maximum and the amount of bicarbonate precipitated will be a minimum.

The sesquicarbonate precipitated and separated from the brine as above described is marketable as such, or may be readily converted to any of the standard soda compounds such as soda ash, sodium hydroxide, etc. The brine from which the portion of sodium carbonate has been recovered as above described may be then treated further for recovery of other constituents or may be returned to the main body of brine in the lake. Instead of reducing the rate of supply of carbon dioxide to the brine by reducing the concentration of carbon dioxide in the gas I may reduce the rate of flow of such gas for example by reducing the pressure or the volumetric rate of flow at which it is supplied, so as to effect a corresponding reduction in the rate at which carbon dioxide is brought into contact with the sodium carbonate in solution and thus tend to produce sodium sesquicarbonate instead of sodium bicarbonate. Or, as in the example above given, both the concentration and the rate of flow may be diminished. The carbon dioxide bearing gas used in my process, when produced by the operation of a lime kiln will, in general, contain in addition to the carbon dioxide, a large amount of nitrogen and small amounts of other gases. It may be stated that in general for production of about 18½ tons of carbon dioxide, about 30 tons of limestone and about 3 tons of coke (85% C.) will be used and the carbon dioxide in the gas is obtained partly from the limestone and partly from the coke. The carbon dioxide bearing gas so produced may contain a higher concentration of carbondioxide than is desirable for carrying out my improved process as above described and may in such case be diluted by admitting air or other diluting gas thereto at any desired stage of the operation, for example after the gas has passed through the ordinary scrubbers and before it passes to the pump or blower for forcing it into contact with the brine.

In addition to the above mentioned mechanical advantages of my process over the ordinary methods of removing soda by precipitation as sodium bicarbonate, such advantages resulting principally from the coarsely crystalline precipitate obtained by my process, I obtain the further advantage of a reduction to about one third in the carbon dioxide consumption as compared with such other methods (for example, a reduction from 5000 pounds to 1700 pounds in the particular case above discussed). The reason for this reduction in the carbon dioxide required to remove a given amount of soda from the brine is evident from the following equations, in which the water of crystallization is disregarded for the purpose of simplification:

I. $Na_2CO_3 + CO_2 + H_2O = 2NaHCO_3$

II. $3Na_2CO_3 + CO_2 + H_2O =$
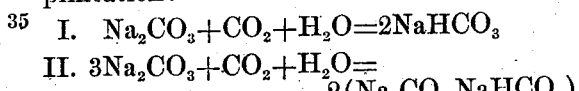
$2(Na_2CO_3 \cdot NaHCO_3)$

Equation No. I represents the reaction ordinarily obtained in the precipitation of bicarbonate and it will be seen from this equation that one molecular equivalent of carbon dioxide is required for each molecular equivalent of sodium carbonate removed from the brine. Equation No. II represents the reaction involved in the precipitation of sesquicarbonate and it is seen that in this case one molecular equivalent of carbon dioxide is sufficient to convert three molecular equivalents of sodium carbonate to the form of sesquicarbonate in which it is precipitated. By means of my invention therefore, for a given consumption of carbon dioxide, three times as much soda is removed from the brine and made available for use or for sale as is the case with the former methods.

In my process as above described the formation of sesquicarbonate may take place directly as indicated in Equation No. II above or it may consist in two steps: first, the formation of bicarbonate, and second the reaction of such bicarbonate, during the carbonation, with an equi-molecular proportion of normal carbonate to form sesquicarbonate. It has been known heretofore to carbonate complex brines containing sodium carbonate in such manner as to obtain a precipitate of bicarbonate and then to add the precipitated bicarbonate (either in solid form or as a suspension in water) to a further quantity of sodium carbonate solution so as to cause precipitation of sesquicarbonate. But it has never been known before to my knowledge to so carry out the carbonation of such brines that both of these operations are performed at the same time. I have found however that by sufficiently reducing the rate of supplying carbon dioxide to the brine for example as above described (that is to say by supplying, for example, only 1,700 pounds of carbon dioxide in 12 hours, as against 5,000 pounds ordinarily supplied in 9 hours for 18,000 gallons of brine) and properly controlling the temperature during carbonation, the precipitate may be obtained principally or wholly in the form of sesquicarbonate and if it be assumed that the formation of sesquicarbonate takes place in two steps as above mentioned then it is apparent that the precipitation of sesquicarbonate instead of bicarbonate is due to the lower rate of carbonation which, in the presence of the other salts in the brine, permits the bicarbonate as formed, and before reaching a sufficient concentration to cause precipitation thereof as such, to react with an equi-molecular proportion of normal carbonate and form sesquicarbonate which precipitates out.

I claim:

1. The process of recovering soda from complex brine containing the same which consists in carbonating the brine by bringing it into contact with carbon dioxide bearing gas having a concentration of carbon dioxide of less than 33% in such manner as to cause precipitation of sodium sesquicarbonate, during such carbonating operation, and separating the precipitated sodium sesquicarbonate from the brine.

2. The process of recovering soda from complex brine containing the same, which consists in carbonating the brine by bringing it into contact with carbon dioxide-bearing gas having a concentration of carbon dioxide of less than 28%, in such manner as to cause precipitation of sodium sesquicarbonate during such carbonating operation, and separating the precipitated sodium sesquicarbonate from the brine.

3. The process of recovering soda from complex brine containing the same which consists in carbonating the brine by bringing it into contact with gas containing between 23 and 28% carbon dioxide in such manner as to cause precipitation of sodium sesquicarbonate during such carbonating operation, and separating the precipitated sodium sesquicarbonate from the brine.

4. The process of recovering soda from complex brine containing the same, which consists in carbonating the brine by bringing it into contact with carbon dioxide-bearing gas having a concentration of carbon dioxide of less than 28%, at a temperature below 40° C., and in such manner as to cause precipitation of sodium sesquicarbonate during such carbonating process, and separating the precipitated sodium sesquicarbonate from the brine.

5. The process of recovering soda from complex brines containing the same, which consists in bringing the brine into contact with carbon dioxide bearing gas in such manner as to cause the absorption of carbon dioxide by the brine at a rate materially less than 30 pounds of carbon dioxide per hour per 1,000 gallons of brine, so as to cause precipitation, during such operation, of a precipitate consisting largely of sodium sesqui-carbonate, and separating such precipitate from the brine.

6. The process of recovering soda from complex brines containing the same, which consists in bringing the brine into contact with carbon dioxide bearing gas in such manner as to cause absorption of carbon dioxide by the brine at a rate of approximately 8 pounds of carbon dioxide per hour per 1,000 gallons of brine, so as to cause precipitation, during such operation, of a precipitate consisting largely of sodium sequicarbonate and separating such precipitate from the brine.

In testimony whereof I have hereunto subscribed my name this 21st day of July 1925.

WALTER A. KUHNERT.